H. HURM.
CRYSTALLINE OR LIKE DETECTOR FOR ELECTRIC WAVES.
APPLICATION FILED APR. 12, 1917.

1,251,378.                                  Patented Dec. 25, 1917.

INVENTOR
Horace Hurm
BY
ATTORNEY

UNITED STATES PATENT OFFICE.

HORACE HURM, OF PARIS, FRANCE.

CRYSTALLINE OR LIKE DETECTOR FOR ELECTRIC WAVES.

1,251,378.

Specification of Letters Patent.　　Patented Dec. 25, 1917.

Application filed April 12, 1917.　Serial No. 161,650.

*To all whom it may concern:*

Be it known that I, HORACE HURM, a citizen of the Republic of France, residing at Paris, France, have invented certain new and useful Improvements in Crystalline or like Detectors for Electric Waves, of which the following is a specification.

In a detector for electric waves with crystals or the like, the contact hitherto has been constituted by a metal point resting on the detector substance. The search for sensitive contact points with this single contact is long and tedious while detectors of this kind get out of order at the least movement, shock or vibration.

The present invention obviates all the above disadvantages, and consists in replacing the single contact by a device with multiple but independent contacts distributed over the surface of the detector substance employed. Each of the said contacts can be successively connected to the main wire of the instrument by means giving a rapid connection; that is to say a movable switch lever or its equivalent. In this way the search on eight to fifteen points or more is effected within a very short time, and it is then possible to return immediately to the contact point which gives the best sound (which is not possible with detectors with a single contact), for if a sensitive contact point is passed over in order to find another of greater efficiency, it is necessary to start over again in order to rediscover the original point. In practice it is very rare not to meet with a sensitive point when eight contacts are used. If this should be the case, however, a simple movement of the detector substance or of the contacts will be sufficient to give eight new contacts.

The invention further remedies the defect of instability in the metal point by causing the point to pass through a hole made in the insulating material (or even in the conducting material, in the case of a single contact) arranged as close as possible to the detector substance, the hole being of such a size that the point freely slides in it throughout the whole or part of its length, but without any lateral movement, the hole being in a strictly fixed position relatively to the detector substance. The point or the substance can then be definitely fixed, or maintained in position at will by any desired locking means. In that way the point will always rest on the point selected, without any shock, even a violent one, being able to move it.

In the case of a multiple contact apparatus, this stabilizing device makes it possible to bring the points very close together and to group them in a very restricted space, without danger of their becoming short-circuited, since each point is maintained in its guide parallel to its immediate neighbors and separated from the same by an insulating partition.

The accompanying drawings show, by way of example, the device according to the invention.

Figure 3:
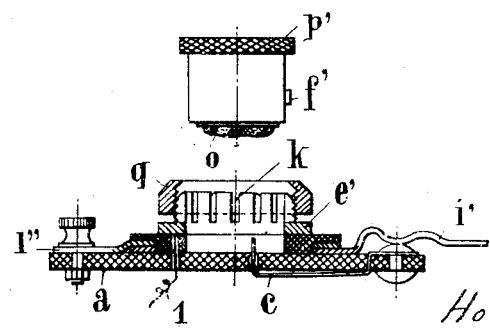

Fig. 3 a sectional elevation of a modified construction.

Figure 1:
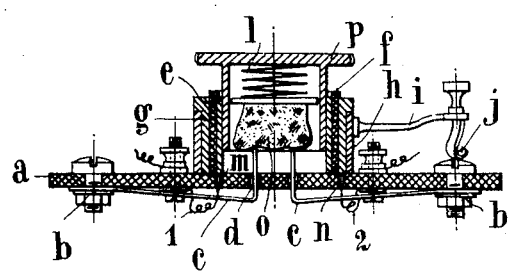
Figure 1 is a section taken through the axis of the apparatus.
Figure 2:
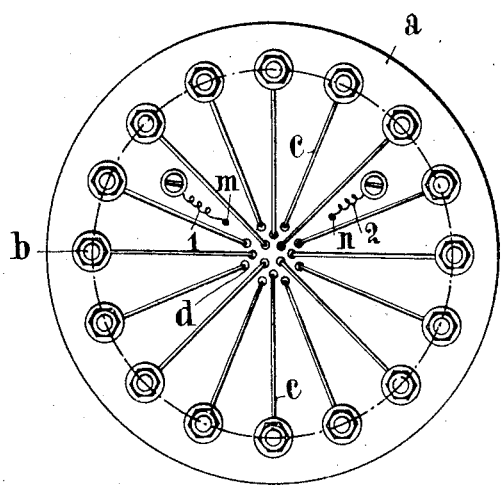
Fig. 2 is a bottom view.

$a$ is a plate of insulating material, in the center of which are provided 16 holes $d$ arranged so that the flexible wires $c$ bent to a suitable angle, can pass from each of the said holes to one of the corresponding contacts $b$ without fouling, or interfering with each other. The bent parts or points of these spring wires pass right through the plate $a$ and project slightly at the other side (Fig. 1).

These points are arranged in a very small area, and they come out in the center of a metal tube $e$ secured to the plate $a$. A wire 1 soldered to the tube $e$, passes through the plate $a$ at $m$ without touching the spring wires $c$. This wire 1 is connected to the terminal of the aerial wire. Around the tube $e$ is placed a tube $f$ of fibrin or other insulating material. Over the said insulator is arranged another metal tube $g$ fitting tightly on to the insulating tube $f$. From the said tube $g$ leads a wire 2 passing through an opening $n$ in the plate $a$ and extending to the earth terminal. Around the tube $g$ pivots or rotates freely a metal ring $h$ carrying a handle or lever $i$ successively coming into contact with the contacts $b$ through the intermediary of a spring blade $j$.

Into the metal tube $e$ is introduced, fairly tightly, a metal capsule $p$ containing the detector substance $o$, the contact surface of which is secured at the level of the edges of the capsule $p$ in order to touch the plate $a$ parallel to the latter when the capsule $p$ is forced in vertically. The detector substance meets first the points of the spring wires $c$ and pushes them back, until they are level with the plate $a$. The spring wires, owing to their elasticity, exercise a pressure on the surface of the detector substance $o$ at an exact and immovable point. Instead of permanently securing the detective substance in the capsule $p$, to the bottom of the capsule could be secured a suitable spring $l$ intended to press the detector substance forcibly against the plate $a$. The latter device makes it possible easily to change the detector substance or its various faces.

The passage of electric waves through the detector in question is as follows:—

The current enters through the aerial wire 1 and passes successively through the metal tube $e$, capsule $p$, spring $l$ (or the alloy, if the detector substance be secured permanently), then through the detector substance $o$, one of the spring wires $c$, the corresponding terminal $b$, spring $j$, lever $i$ ring $h$, tube $g$ and the earth wire 2.

Moreover, the arrangement of the tube $e$ and of the tube $g$ separated from each other by the insulating substance $f$, forms a condenser, connected in shunt with the detector. One of the contacts could be used for earthing, the spring wire being done away with, and the contact in question being connected to the wire 1 or to the aerial wire terminal.

Fig. 3 shows a multiple contact detector intended mainly for direct application to connections of a telephone receiver.

The fixing of the capsule carrying the crystal (galena) is different from that of the preceding construction. This capsule $p'$ is provided with a projection $f'$ owing to which it can be introduced into the slots $k$ in the tube $e'$, only in the vertical direction. The spring points $c$ thus cannot get bent, however weak they be, by a movement of rotation of the capsule $p'$. The capsule holder tube $e'$ has the largest possible number of slots $k$ for the purpose of allowing of a very slight movement of the detector surface $o$ relatively to all the spring-controlled points $c$. The said capsule-holding tube is screw threaded outside and terminates in a cone. A nut $q$ screwed on the capsule-holder tube $e'$, enables the capsule to be locked in the position selected. The capsule holder tube is joined to one of the connections of the receiver by a wire passing under the insulator plate $a$. The contact handle $i'$ comprises a flat metal disk terminating in a lug slightly projecting beyond the circumference of the detector. This disk rotates about the capsule holder $e'$ from which it is insulated. A similar disk, the lug $i''$ of which is secured to the second connection, presses on the first disk in order to prevent it from moving automatically and to insure firstly the various contacts of the handle $i'$ with the second connection, and secondly with the contacts of the spring-wires. The distribution of the points is calculated so that each point of the detector surface can be touched only by a single point.

What I claim as my invention and desire to secure by Letters Patent is:—

1. A crystalline or like detector for electric waves comprising a plate of insulating material, a tube projecting upwardly from said plate, a capsule fitting said tube and containing a crystal, a plurality of spring contact wires having their ends movably extending through holes in the plate and pressing against the under surface of said crystal, and a contact handle mounted to rotate about said tube as an axis and adapted, during its rotation, to engage the successive wires.

2. A crystalline or like detector for electric waves comprising a plate of insulating material, a slotted metal tube extending upwardly from said plate, a capsule fitting into the metal tube and having a projection thereon which fits selectively in the slots in the slotted tube, a crystal contained in the capsule, and a contact wire fixed to the lower side of the plate and extending upwardly therethrough.

3. A crystalline or like detector for electric waves, comprising a plate of insulating material having a series of holes therein; a series of spring contact wires fixed to the under side of said plate and having up-bent terminals which extend loosely through said holes; a tube projecting upwardly from said plate; a capsule fitting into said tube; and a crystal contained in said capsule and contacting at its under surface with said terminals so as to force them downward through said holes.

In testimony whereof I have signed this specification in the presence of two subscribing witnesses.

HORACE HURM.

Witnesses:
 EMIL LEDRAL,
 CHAS. P. PRESSLY.